US008464757B2

(12) United States Patent
Rüb

(10) Patent No.: US 8,464,757 B2
(45) Date of Patent: Jun. 18, 2013

(54) HYDRAULIC VALVE DEVICE

(75) Inventor: Winfried Rüb, Waldshut-Tiengen (DE)

(73) Assignee: Hydac Filtertechnik GmbH, Sulzbach/Saar (DE)

(*) Notice: Subject to any disclaimer, the term of this patent is extended or adjusted under 35 U.S.C. 154(b) by 344 days.

(21) Appl. No.: 12/734,289

(22) PCT Filed: Oct. 9, 2008

(86) PCT No.: PCT/EP2008/008519
§ 371 (c)(1),
(2), (4) Date: Apr. 22, 2010

(87) PCT Pub. No.: WO2009/062572
PCT Pub. Date: May 22, 2009

(65) Prior Publication Data

US 2010/0300552 A1 Dec. 2, 2010

(30) Foreign Application Priority Data

Nov. 14, 2007 (DE) ........................ 10 2007 054 137

(51) Int. Cl.
*F16K 11/07* (2006.01)
*F15B 13/043* (2006.01)
*F15B 11/08* (2006.01)
*F15B 13/04* (2006.01)

(52) U.S. Cl.
USPC .................. 137/625.69; 91/466; 137/625.64; 137/625.66

(58) Field of Classification Search
USPC ............ 137/625.64, 625.66, 625.69; 91/461, 91/466
See application file for complete search history.

(56) References Cited

U.S. PATENT DOCUMENTS

| | | | | |
|---|---|---|---|---|
| 3,565,110 | A * | 2/1971 | Robert F Hodgson | 137/596.12 |
| 3,771,564 | A * | 11/1973 | Bianchetta et al. | 137/625.63 |
| 4,253,482 | A * | 3/1981 | Stephens | 137/115.07 |
| 4,981,159 | A * | 1/1991 | Christensen et al. | 137/625.69 |
| 5,005,467 | A * | 4/1991 | Wennerbo et al. | 91/461 |
| 5,353,686 | A * | 10/1994 | Nakamura | 91/461 |
| 5,765,594 | A * | 6/1998 | Collins et al. | 137/625.48 |
| 5,957,159 | A * | 9/1999 | Takahashi et al. | 137/596 |

FOREIGN PATENT DOCUMENTS

| | | | |
|---|---|---|---|
| DE | 34 13 866 | A1 | 11/1984 |
| DE | 88 01 058 | U1 | 3/1988 |
| DE | 603 04 663 | T2 | 8/2006 |
| DE | 10 2005 050 169 | A1 | 12/2006 |
| EP | 0 786 598 | A1 | 7/1997 |
| EP | 786598 | A1 * | 7/1997 |
| EP | 1 370 773 | B1 | 12/2003 |

* cited by examiner

*Primary Examiner* — John Rivell
*Assistant Examiner* — Frederick D Soski
(74) *Attorney, Agent, or Firm* — Roylance, Abrams, Berdo & Goodman LLP

(57) ABSTRACT

A hydraulic valve device includes a fluid connection arrangement (10) having different connections and a mobile control (18) for at least partially controlling connections of the fluid connection arrangement (10). The control (18) is provided with load reporting and load detecting connections (32, 38; 34, 36). According to the displacement position of the control (18), at least one part of the connections of the fluid connection arrangement (10) are interconnected in a fluid-guiding manner. The control can then be brought with precision into the required functional positions, with a favorable dynamic driving behavior.

15 Claims, 6 Drawing Sheets

HYDRAULIC VALVE DEVICE

FIELD OF THE INVENTION

The invention relates to a hydraulic valve device with a fluid connector arrangement containing at least a pressure supply connector P, a return flow connector R, a section load sensing connector LS, two control connectors $P'_A$ and $P'_B$ and two utility connectors A, B, and a displaceable control for at least partially triggering connectors of the fluid connector arrangement.

BACKGROUND OF THE INVENTION

DE 603 04 663 T2 discloses a hydraulic valve arrangement with a supply connector arrangement including a high pressure connector P and a low pressure connector T. A working connector arrangement having two working or utility connectors A, B can be connected to a consumer, a directional valve, and a compensation valve located between the directional valve and the supply connector arrangement P, T. The pressure output of the supply connector arrangement is connected to the pressure input of the directional valve. The compensation valve has a relief output that can be connected to the pressure output and a valve element in the form of a spool that can be moved out of an initial position in opposite directions. The spool can be exposed on one side to pressure in the load sensing line and to the force of a spring, and on the opposite side can be exposed to the pressure at the pressure output. The valve element, when moved in one direction performs a pressure control function, and when moved in the opposite direction performs a pressure relief function. The spool has a longitudinal channel connected via a transverse bore to the pressure output and ends in a first pressure chamber. The longitudinal channel extends beyond the transverse bore and is connectable via a closable opening to a second pressure chamber in which a relief pressure prevails.

With this known solution, parasitic pressure propagation, as can occur especially at higher pressures, can be counteracted. With the accompanying essentially inevitable leaks, the pressure propagates as far as an actuation motor that should not be actuated at all, but then sets it into motion. This actuation can result in the unintended and hazardous raising of loads. In this connection, the safety valves have been used in the past but, can be subject to leaks and can even contribute to the formation of the parasitic pressure propagation.

EP 1 370 773 B1 discloses a comparable directional control valve as a hydraulic valve device used for controlling the pressure and the flow of hydraulic oil from and to working connectors A, B of at least one fluid consumer. The pressure and flow rate can be controlled by a valve spool movable in the spool bore and actuatable by at least one drive. By annular channels dynamically connected to it, at a symmetry center point on the axis of symmetry of the valve device, a tank connector annular channel as a return flow connector and on both sides other annular channels are arranged likewise symmetrically to the axis of symmetry. Due to the symmetrical structure, this known solution has a simple solution from a mechanical viewpoint and thus allows economical fabrication. The known valve device is intended to also have improved dynamic switching behavior and a wide scope of operation.

The known solutions, however, overall are still complex in production. For any fluidic application generally, each must be matched and designed accordingly. The known solutions in the prior art with respect to operating reliability still leave much to be desired.

SUMMARY OF THE INVENTION

An object of the invention is to provide an improved hydraulic valve device, while maintaining the prior art advantages, such that operating reliability is still further improved and that the solution according to the invention can be well executed relative to changing applications in terms of a modular system.

This object is basically achieved by a hydraulic valve device having a control provided with load reporting and load sensing connectors interconnected in pairs and assigned one load reporting connector to one load sensing connector. Depending on the position of movement of the control, at least some of the connectors of the fluid connector arrangement interconnect to carry fluid. The control as a modular block concept can be easily adapted to different fluidic applications without greater modification or adaptation efforts to the hydraulic valve device becoming necessary. Due to the asymmetrical structure of the control acting in this respect on the fluid connector arrangement, reliable triggering behavior is achieved. Also, the control can then be moved with an extremely favorable dynamic displacement behavior exactly into operating positions. The solution according to the invention, viewed mechanically, is short, so that all relevant switching and control positions for the hydraulic valve devices can be implemented in a small installation space. In one especially preferred embodiment of the hydraulic valve device, according to the invention, the control can also assume a floating position without loss of resolution in the lowering and lifting region relative to the working or utility connectors A, B. Although, as shown, the proportional region is fully preserved in lifting and lowering, due to the special concept of the control, the length of the housing still is kept short overall, to which the asymmetrical structural concept of the hydraulic valve device also contributes.

In another especially preferred embodiment according to the invention, upstream from the control a pressure compensator is connected. A quantitative cutoff by load sensing pressure limitation in the spring chamber of the pressure compensator is then possible. In the prior art with a downstream pressure compensator, this function of quantitative cutoff is not possible or can be obtained in a complex manner only by corresponding additional valve structures. In particular, the control function of the pressure compensator is improved by a relatively large drainage cross section discharging into the return flow connector. The floating position is also improved.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure and which are schematic and not to scale.

DETAILED DESCRIPTION OF THE INVENTION

Figure 1:
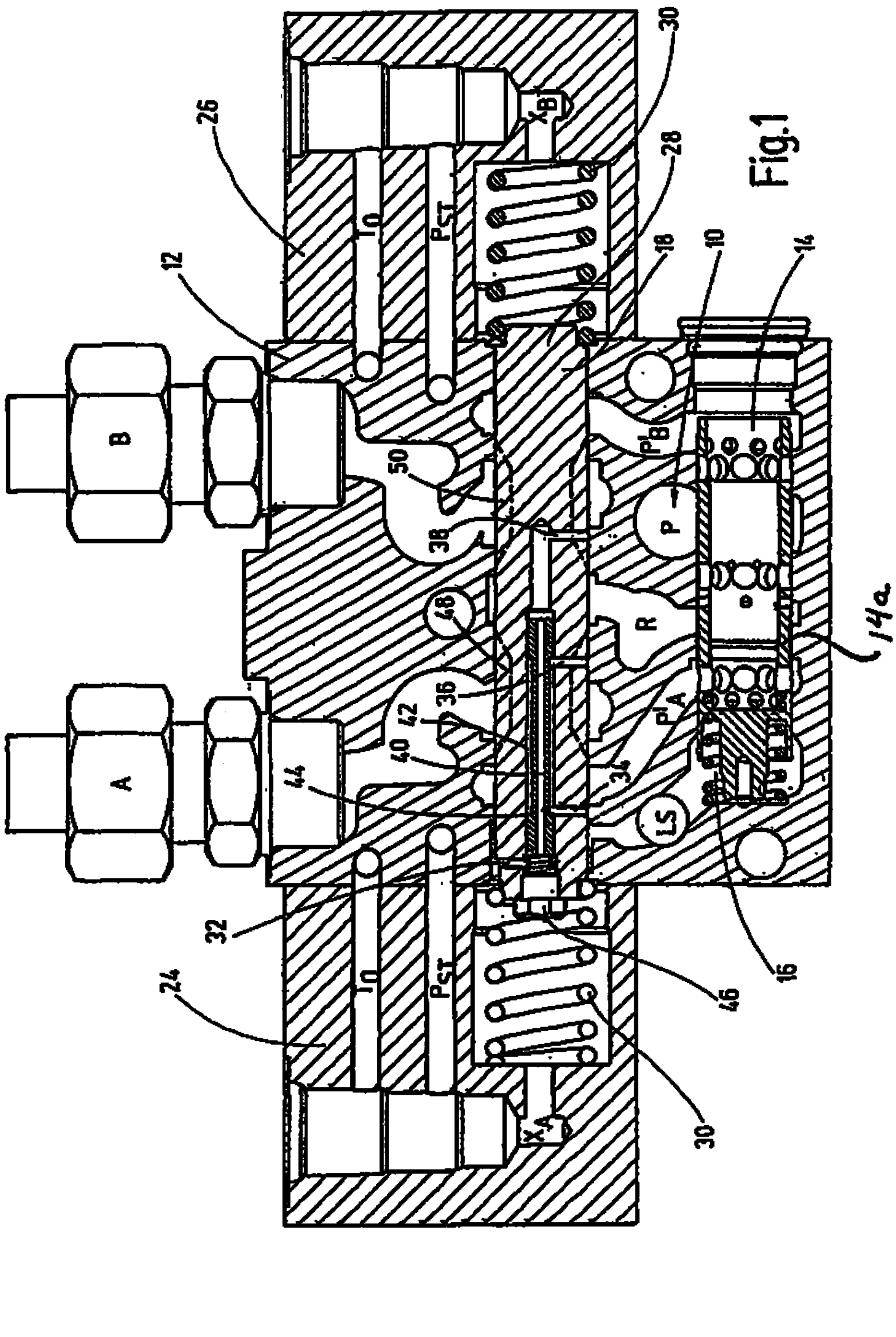
FIGS. 1 and 2 are side elevational views in section of hydraulic valve devices according to first and second exemplary embodiments of the invention, respectively the pressure compensator being located in its respective control position.

FIG. 1 shows a fluid connector arrangement 10. This fluid connector arrangement 10 has a pressure supply connector P, a return flow connector R, a section load sensing connector LS, two control connectors $P_A'$, $P_B'$ and two utility connectors A, B. The fluid connectors LS, $P'_A$, R, P, $P'_B$, A, and B are accommodated in a control housing 12. As viewed in at FIG. 1, the lower end of the control housing 12 is provided with a conventional pressure compensator 14 having a compensator spool 14*a* connected upstream from the connectors LS, $P'_A$, R, P and $P'_B$ and triggers or controls them accordingly. With the pressure compensator 14 connected upstream, the quantitative cutoff function is attained by LS pressure limitation in the spring chamber 16 of the pressure compensator. Quantitative cutoff makes sense, for example, when the steering cylinder connected to the utility connectors A, B is at the limit stop, and the inflow amount is to be cut off to prevent overloads.

Figure 3:
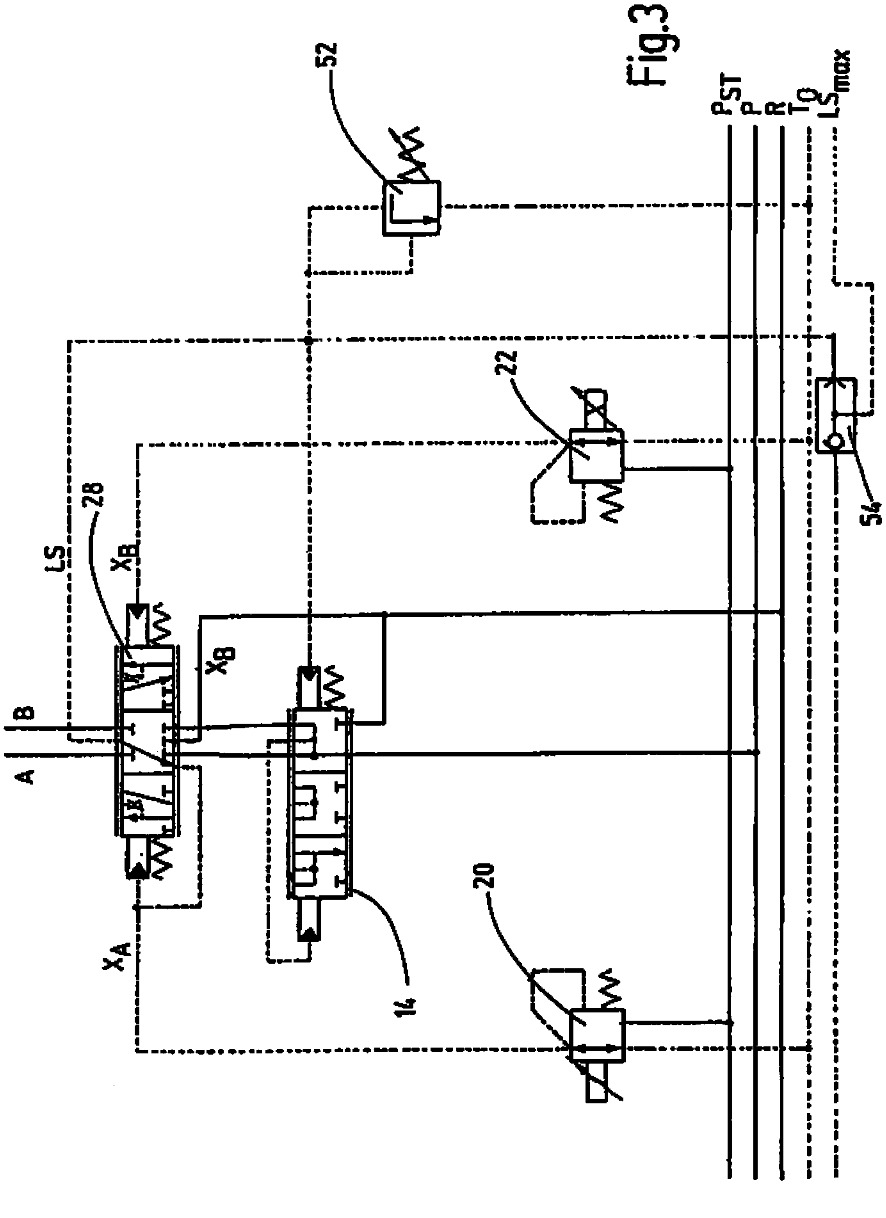
FIG. 3 is a circuit diagram of the valve devices shown in FIGS. 1 and 2.

The control 18 is triggered or controlled conventionally, and therefore, is not described in detail, as are conventional pilot valves 20, 22 shown in FIG. 3 by their hydraulic switching symbols. For the sake of simplicity, these pilot valves are shown in FIG. 1 only to the extent that their respective pilot housings 24, 26 are addressed. On the output side, the two pilot valves 20, 22 for the control 18 deliver two control pressures $X_A$ and $X_B$ acting in opposite directions. A pump control pressure $P_{ST}$ acts on the respective pilot valve 20, 22. A tank connector line $T_0$ is likewise connected to the respective pilot valve.

The control 18 has a valve spool 28 movable horizontally, as viewed in FIG. 1. In FIG. 1 valve spool 28 is shown in its undeflected middle or neutral position. This neutral position of the valve spool 28, additionally, is supported by two spring storage devices made as compression springs 30 and integrated in the respective spring chambers in the pilot housings 24, 26. This structure is conventional in the corresponding hydraulic valve devices will not be described in further detail. The control 18 with the valve spool 28 is provided with load reporting connectors 32, 34 and with load sensing connectors 36, 38 interconnected in pairs to carry fluid. Specifically, the first load reporting connector 32 is connected to the second load sensing connector 38 to carry fluid or to be in fluid communication. The second load reporting connector 34 is fluid-connected to or in fluid communication with the first load sensing connector 36. These reporting connectors and sensing connectors are integrated in the valve spool 18 in the form of transverse radial bores. Depending on axial position of the valve spool 18, the connectors 32, 34, 36 and 38 are connected to the respective connectors of the fluid connector arrangement 10 to carry fluid or to block.

The possible switching positions follows from the conventional switching representation as shown in FIG. 3 and are not described in detail. To produce the fluid-carrying connection between the load reporting and load sensing connectors 32, 36; 34, 38 assignable to one another in pairs, connecting channels 40, 42 located within the valve spool 28 are used. One of the connecting channels 40 is a middle channel. In the neutral position of the control 18 shown in FIG. 1, the axial length of middle channel 40 covers the region between the section load sensing connector LS and the utility connector B. In this respect, the middle channel, as viewed in FIG. 1, is located on the left side of the valve spool 28 and extends in the form of an attached blind hole along the longitudinal axis of the valve spool 28. In a parallel arrangement thereto, another connecting channel 42 is at least one annular longitudinal channel. In the neutral position of the control 18, the axial overall length of channel 40 covers at least the region between the control connector $P'_A$ and the utility connector A. The load reporting and load sensing connectors 32, 36, 34, 38 are each made as radially extending bores in the valve spool 28.

For producing the channel routing, the middle channel 40 is bordered by an insertion sleeve 44. At least partially along its outside periphery insertion sleeve 44 is located in a definable middle region. The inside wall of the valve spool 28 in this middle region borders the annular longitudinal channel 42 that can also be formed here from a plurality of individual channels (not shown) located concentrically to the middle channel 40. The axial length of the insert sleeve 44 extends, as shown in FIG. 1, between a first load reporting connector 32 and a constricted offset site between the first load sensing connector 36 and the second load sensing connector 38 at the height of the return flow connector R. The insert sleeve 44 has a right end as viewed in FIG. 1, supported at the constriction within the longitudinal bore of the valve spool 28. The opposite, other free end of insertion sleeve 44 in the region of the first load reporting connector 32 rests on a compression spring 45 extending between a sealing stopper 46 and the free end of the sleeve and keeping the insertion sleeve 44 in its position with definable pretensioning. Longitudinal tolerances that may be present can be equalized in the system of the insertion sleeve 44 to the valve spool 28 by this arrangement.

As FIG. 1 shows, the valve spool 28 along its outer periphery has two control channels 48, 50 oriented lengthwise. In the neutral position of the control 18, each channel 48, 50 discharges into the utility connector A and the utility connector B, respectively. Accordingly, in the illustrated neutral position of the valve spool 28, the load sensing bore 36 emerges under the housing wall between the utility connector A and the return flow connector R.

Overall, the hydraulic valve device forms a LS directional control valve with an upstream pressure compensator 14. As the switching position illustrated in FIG. 3 shows, to protect parts of the hydraulic circuit, at least one pressure limitation valve 52 is provided, and the load sensing portion LS is adjusted relative to LS max by a selector valve 54.

The hydraulic valve device according to the invention is made as a LS directional control valve with upstream pressure compensator 14 and has a valve axis configuration short in terms of overall length with few annular channels compared to known solutions. With the upstream pressure compensator 14, the described function of quantitative cutoff by LS pressure limitation in the spring chamber of the pressure compensator 14 is possible.

Figure 2:
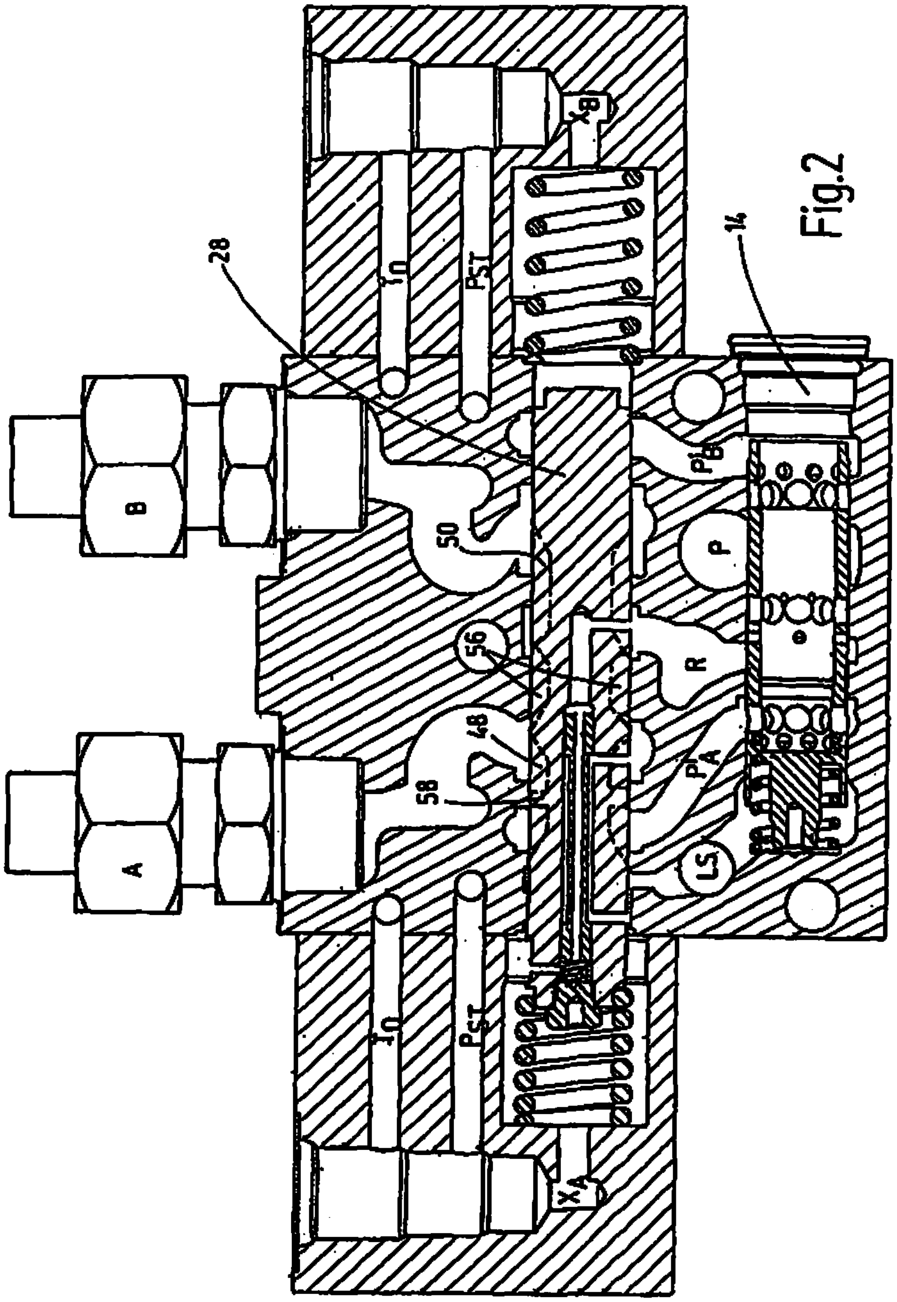

The embodiment as shown in FIG. 2 described below relates to a floating position design. This valve structure is comparable to the valve structure as shown in FIG. 1. In this respect, in the solution shown in FIG. 2, the same components are designated with the same reference numbers, and the pertinent statements then also apply to the altered or second embodiment. The second embodiment is described below only to the extent it significantly differs mechanically from the above described embodiment as shown in FIG. 1.

In the embodiment shown in FIG. 2, the valve spool 28 along its outer periphery between the two groove-shaped control channels 48, 50, additionally has separate pockets 56 separated from one another in different angle arrangements and extending along the valve spool 28. In the control channel 48, at least in the region of the utility connector A, a segmenting partition 48 is drawn in. In the floating position shown in FIG. 2 the utility connector A is in a fluid-carrying connection to the individual pockets 56 of the valve spool 28.

With the illustrated valve arrangement of FIG. 2, using additional pockets 56 between the two control channels 48, 50, a floating position for the valve can be achieved without loss of resolution in the lowering and lifting region of the hydraulic arrangement.

With the valve device solution according to the invention, it is possible to achieve the combination of a floating position and a quick traverse in a mobile valve in a spool construction. This construction is especially efficient for use in conventional machinery (not shown) in which machines must be quickly moved and/or when they must be picked up and put down in the manner of a pivoting position. This need is for example the case for a reciprocating finger bar mover of a slope mower or the like.

Figure 4:
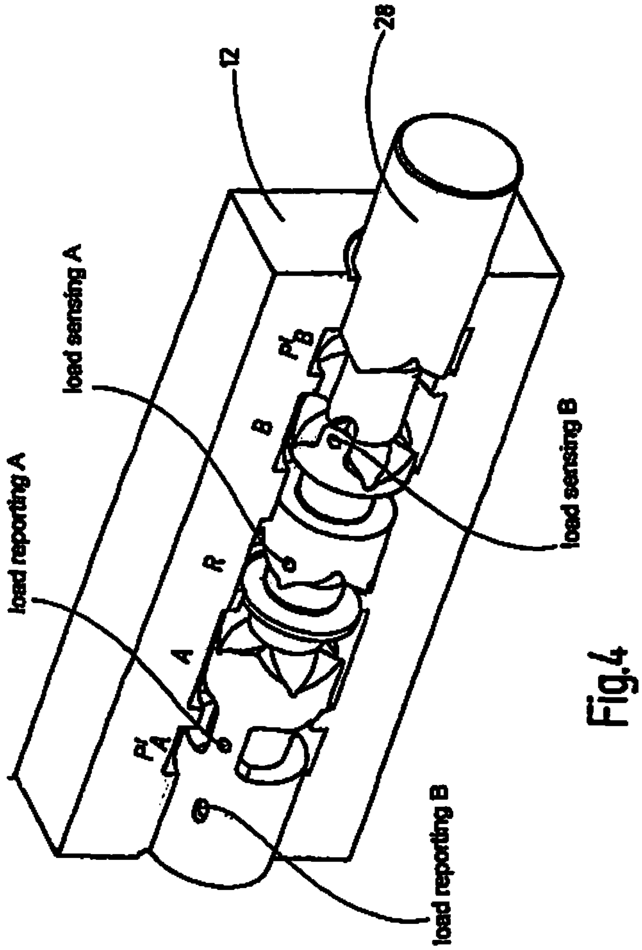
FIG. 4 is a perspective view in section of the valve spool in the "quick traverse" position with its different connection sites; and"

FIG. 4 shows only the valve spool 28 together with the housing connectors LS, $P'_A$, A, R, B, $P'_B$ also contributing to the implementation of the pertinent quick traverse position. In the quick traverse position, the fluid-carrying connection P to B is maintained, the connection A to R is closed and, for this purpose, the connection A to P is opened to enable return flow from the rod side (annular surface) of a working cylinder of the machinery (not shown) toward the ground side (bar mower application). One load sensing bore of the valve spool 28 is in the pressure connector B, and one load reporting bore is routed to an assignable housing pocket in the valve spool 28. This load reporting bore ends on the jacket or outer surface of the valve spool 28, the jacket surface being locally routed around the exit of the reporting bore. Otherwise, the jacket surface is opened and recessed to form a return flow cross section from A to P. So that the rotary position of the load reporting bore and housing pocket is preserved, a mechanical locking element (not shown) for the valve spool 28 is provided. The other load sensing bore is then in the R-channel, and the corresponding other load reporting bore is under the housing wall between $P'_A$ and the A-channel. The quick traverse position of the valve spool 28 is reached by overtravel via the lifting position and the floating position via the lowering position of the connected hydraulic components of the machine. This arrangement corresponds to the desired operating states on the indicated machines since the quick traverse as a switching position should not be engaged directly from “neutral” to avoid an overly strong switching pressure.

Figure 5A:
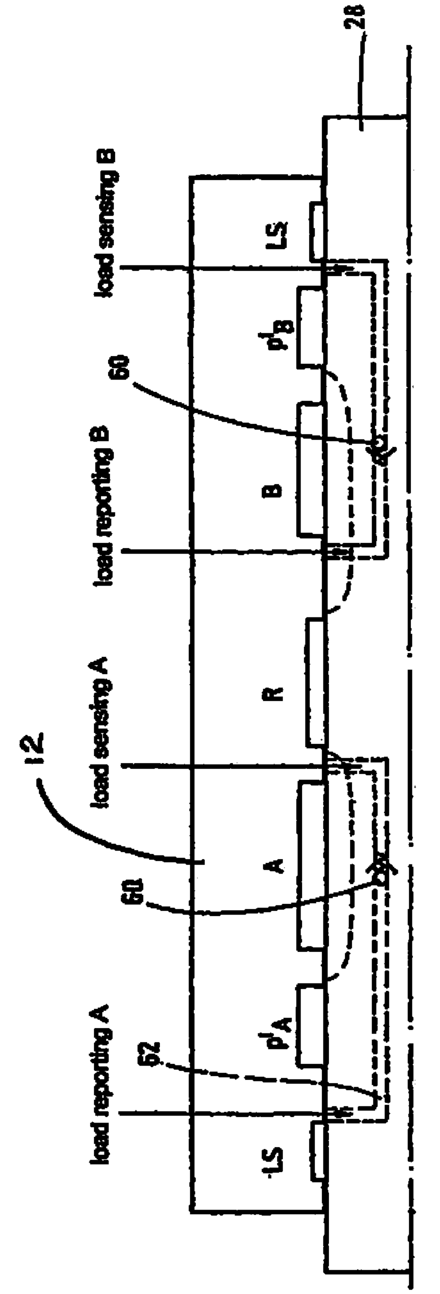
FIGS. 5A and 5B simplified side elevational views in section through a third embodiment according to the invention of the valve spool with its various connection sites, with FIG. 5A shown in the neutral position and with FIG. 5B shown in the deflected actuating position.

Since the reporting channel of the load sensing pressure must be opened into the spring chamber of the section pressure compensator over the entire stroke of the valve spool 28, the valve axis cannot be shortened relative to this function. This shortening would benefit the overall size of the valve device. Conversely, an improvement can be achieved in the covering of the reporting bore on the valve spool 28. For the proposal according to the invention shown in FIGS. 1 and 2, the LS reporting bores travel into the pressure channels, insofar as the floating position is addressed there. To avoid a malfunction in the form of an impermissible flow from other pressure channels into the LS reporting circuit, additional means are used in the form of check valves 60, as shown in FIG. 5.

In the neutral position of the valve spool 28 (shown in FIG. 5A), the radial load sensing bore and the radial load reporting bore are each covered by the housing wall. The concept of a short construction dictates that in the “lifting” position (working position of the machinery) the load reporting bore of the connector A extends into the P connector and the load sensing bore extends into the R connector. To prevent short-circuiting from P to R, a check valve 60 is installed in the corresponding connecting line 62. In the lowering position and in the neutral position, a spring then holds the check valve 60 open so that both pressure reporting flow, as well as dynamic flow dictated by the control movements of the connected pressure compensator 14, are ensured.

The pressure drop on the check valve for rapid control movements of the pressure compensator 14 and the spring force are matched to one another such that for rapid control movements as correspond to a high flow rate, the check valve 60 cannot close. In the lifting position, however, the leakage flow rate from P to R immediately becomes high enough for the pressure drop over the open check valve 60 to overcome the spring force, and the check valve reliably closes. In this respect, therefore, the floating position is also reached by overtravel via the lowering position and the lifting position of the respectively connected machine. Here, it is possible that only when the machine has been placed, for example, on the ground in the lowered position is the floating position then engaged.

Figure 5B:
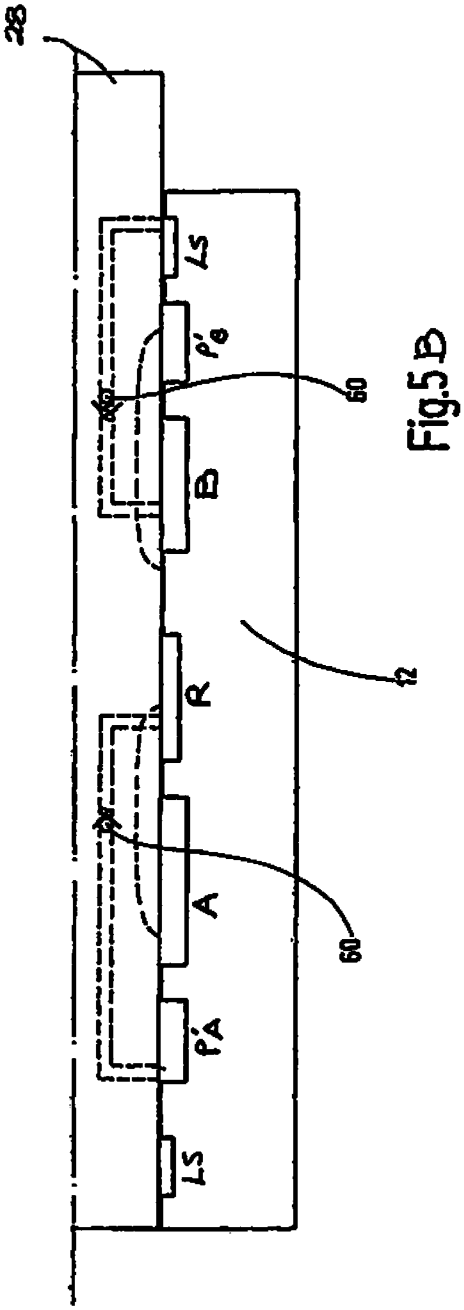

In the embodiment as shown in FIGS. 1 and 2, the check valves 60 shown in FIG. 5 can also be inserted into the control channels 48, 50 (not shown). Then the closing ball opens in the direction of the load sensing connector to achieve comparable results, as described above.

With the valve device according to the invention, standard directional control valves with the three basic positions for neutral, lifting, and lowering can be expanded within the scope of operation to a floating position and/or a quick traverse position without the spool stroke being lengthened in doing so, as in the known spool valve solutions to travel into the additional position with the desired logic operations. Rather, with the solution according to the invention, this spool lengthening can be entirely avoided or the spool valve axis can be shortened.

While various embodiments have been chosen to illustrate the invention, it will be understood by those skilled in the art that various changes and modifications can be made therein without departing from the scope of the invention as defined in the appended claims.

What is claimed is:

1. A hydraulic valve device, comprising:

a fluid connector arrangement including a pressure connector, a return flow connector, a section load sensing connector, first and second control connectors and first and second utility connectors; and a displaceable control having a valve spool with first and second fluid-carrying connecting channels at least partially controlling said connectors of said fluid connector arrangement individually, said control including first and second load reporting connectors and first and second load sensing connectors interconnected in pairs with said first load reporting connector being connected to said second load sensing connector and said second load reporting connector connected to said first load sensing connector by said connecting channels, respective ones of said connectors of said fluid connector arrangement being connected depending on positioning and movement of said control, said second connecting channel being a longitudinal annular channel with an axial length extending across at least a region between said first control connector and said first utility connector in a neutral position of said control, said first connecting channel being a middle channel bordered by an insertion sleeve, the insertion sleeve and an inside wall of said control limiting said second connecting channel.

2. A hydraulic valve device according to claim 1 wherein said first connecting channel has an axial length extending across a region between said load sensing connector and said second utility connector in the neutral position of said control.

3. A hydraulic valve device according to claim 1 wherein two pilot valves acting in opposite directions are connected to and trigger said control, said control being biased to the neutral position by springs.

4. A hydraulic valve device according to claim 1 wherein said valve spool has first and second groove-shaped control channels on an outer periphery thereof, and oriented lengthwise and discharging respectively into said first utility connector and said second utility connector in the neutral position of said control.

5. A hydraulic valve device according to claim 4 wherein said first and second load sensing connectors comprise first and second load sensing bores extending radially in said valve spool and offset on said outer periphery of said valve spool relative to said first and second control channels, respectively, said first and second load sensing bores end under first and second housing partitions, respectively, between said utility connectors and said return flow connector in the neutral position of said control.

6. A hydraulic valve device according to claim 5 wherein said first and second load sensing bores are separated fluid-tight from one another.

7. A hydraulic valve device according to claim 5 wherein said first control channel contains a partition separating said first control connector from said first utility connector in a floating position of said valve spool.

8. A hydraulic valve device according to claim 4 wherein a longitudinal channel in said valve spool connects said section load sensing connector to a control trigger space in fluid communication in the neutral position of said control.

9. A hydraulic valve device according to claim 1 wherein said first and second load reporting connectors comprise first and second load reporting bores extending radially in said valve spool, said first and second load reporting bores opening adjacent both sides of said section load sensing connector.

10. A hydraulic valve device according to claim 1 wherein a pressure compensator upstream of said control is connected to and at least partial controls said fluid connector arrangement.

11. A hydraulic valve device according to claim 1 wherein at least one check valve is in each of said connecting channels between said load reporting connectors and said load sensing connectors.

12. A hydraulic valve device according to claim 11 wherein the respective check valves close in one of a direction of a first load sensing and a second load reporting and a direction of a second load sensing and a first load reporting.

13. A hydraulic valve device according to claim 11 wherein said valve spool is displaceable beyond a maximum working position into a quick transverse position.

14. A hydraulic valve device according to claim 13 wherein said valve spool in the quick transverse position thereof connects said second control connector to said second utility connector via a control groove and connects said first utility connection and said first control connector via pocket-shaped connecting channels between said load sensing connectors.

15. A hydraulic valve device according to claim 11 wherein said load sensing connectors are aligned in rotary positions thereof to local widenings of said section load sensing connector.

* * * * *